United States Patent [19]

Harada et al.

[11] Patent Number: 5,919,427
[45] Date of Patent: *Jul. 6, 1999

[54] AMORPHOUS ALUMINOSILICATE AND PROCESS FOR PRODUCING THE SAME

[75] Inventors: Atsushi Harada; Hajime Funakoshi; Takeshi Ozawa, all of Yamaguchi, Japan

[73] Assignee: Tosoh Corporation, Yamaguchi, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/638,199

[22] Filed: Apr. 26, 1996

Related U.S. Application Data

[63] Continuation of application No. 08/357,029, Dec. 16, 1994, abandoned.

[30] Foreign Application Priority Data

| Jul. 8, 1994 | [JP] | Japan | 6-157093 |
| Oct. 26, 1994 | [JP] | Japan | 6-262664 |
| Oct. 27, 1994 | [JP] | Japan | 6-263449 |

[51] Int. Cl.$^6$ .................................................. C01B 33/26
[52] U.S. Cl. ...................................... 423/328.1; 423/330.1
[58] Field of Search .............................. 423/328.1, 330.1

[56] References Cited

U.S. PATENT DOCUMENTS 5,262,142  11/1993  Koga et al. ........................... 423/328.1
5,362,466  11/1994  Araya .................................... 423/328.1

FOREIGN PATENT DOCUMENTS 0013123  7/1980  European Pat. Off. .
6227811  8/1994  Japan ............................. C01B 33/26

OTHER PUBLICATIONS

Derwent Abstract of JP–A–6 227 811.

Derwent Abstract of JP–A–58 156 527.

Derwent Abstract of JP–A–62 191 419.

Patent Abstracts of Japan, Abstract of JP–A–62 132724.

Patent Abstracts of Japan, Abstract of JP–A–57 92515.

*Primary Examiner*—Michael Lewis
*Assistant Examiner*—Stuart L. Hendrickson
*Attorney, Agent, or Firm*—Sughrue, Mion, Zinn, Macpeak & Seas, PLLC

[57] ABSTRACT

Disclosed are an amorphous aluminosilicate wherein the total volume of the pores having a diameter of from $10^3$ angstroms to $10^5$ angstroms as measured by the mercury penetration method accounts for at least 60% of the total volume of all the pores detected by the mercury penetration method, and the total volume of the pores having a diameter of from 20 angstroms to 120 angstroms as measured by the nitrogen adsorption method is 0.01 cc/g or larger, and a process for producing the amorphous aluminosilicate.

6 Claims, 2 Drawing Sheets

5,919,427

AMORPHOUS ALUMINOSILICATE AND PROCESS FOR PRODUCING THE SAME

This is a continuation of application Ser. No. 08/357,029 filed Dec. 16, 1994 now abandoned.

FIELD OF THE INVENTION

The present invention relates to a novel amorphous aluminosilicate which is suitable, for example, for use not only as an inorganic filler or additive for rubbers, resins, paper, coating compositions, etc., but also as a carrier for polymeric liquid substances, e.g., an oily substance, or for organic or inorganic substances, a catalyst or deodorant, or a carrier for agricultural chemicals or medicines after ions or ingredients useful for respective purposes are fixed thereto by ion exchange or loading, etc., as an adsorbent for removing free metal ions from aqueous solutions, and as a material for synthesizing a zeolite, and which is improved in ion exchange capacity and oil absorption (the amount of oil supported per unit weight). The present invention also relates to a process for producing the amorphous aluminosilicate.

BACKGROUND OF THE INVENTION

Amorphous aluminosilicates are generally produced by a process in which an aqueous solution of either sodium aluminate or aluminum sulfate is mixed in an appropriate proportion with an aqueous solution of sodium silicate at an appropriate temperature and concentration, if desired further with an aqueous solution of sodium hydroxide, and the amorphous aluminosilicate thus synthesized is separated from the mother liquor by filtration or another means and then cleaned to remove the residual mother-liquor components including the excess alkali. In most cases, the amorphous aluminosilicate obtained is finally dried in some way.

Since the aluminosilicate thus produced actually has some degree of oily substance-absorbing and ion-exchanging properties and other properties, it has been thought to be useful for use as various industrial materials including a catalyst, a catalyst base, an additive for resins, and an ion exchanger.

An example of the above process is disclosed in JP-B-61-25653. (The term "JP-B" as used herein means an "examined Japanese patent publication.") In this prior art process, an amorphous aluminosilicate having high oily substance absorption ability and excellent ion exchange ability is produced by regulating the concentration of an alkali metal oxide to a value within a given range.

However, the amorphous aluminosilicate produced by conventional processes highly tends to aggregate and hence has the following drawbacks. In the case where the amorphous aluminosilicate is used, e.g., as a carrier, a homogeneous product is difficult to obtain even after sufficient mixing. In use in water, aggregates of the amorphous aluminosilicate sediment, making rapid ion capture impossible. When used as a detergent builder, the amorphous aluminosilicate causes troubles such as adhesion of aluminosilicate aggregates to clothes. Moreover, in the case of addition to a resin, etc., it is exceedingly difficult to homogeneously disperse the amorphous aluminosilicate because it shows poor dispersibility due to its strong tendency to aggregate.

With respect to oil absorption ability, the amorphous aluminosilicate produced by conventional processes has the following drawbacks. Since the conventional amorphous aluminosilicate has a large amount of large pores of, e.g., $10^5$ angstroms or larger, these pores are readily destroyed physically, e.g., by pulverization, resulting in a considerable decrease in oil absorption ability. The amorphous aluminosilicate also shows low holding power due to the small contact area where the supported substance is in contact with the aluminosilicate, so that the supported ingredient oozes out with the lapse of time. In contrast, if an amorphous aluminosilicate has a large amount of too small pores, it not only shows strong tendency to aggregate, but also has a drawback that most ingredients once supported thereon cannot diffuse because the ingredients are too tenaciously supported due to large contact area where the ingredients are in contact with the aluminosilicate or because the pore size is too small for the size of the supported molecules. Thus, the amorphous aluminosilicate having a large amount of too small pores also cannot always produce the desired effect (JP-A-6-227811). (The term "JP-A" as used herein means an "unexamined published Japanese patent application".)

There has hence been a desire for an amorphous aluminosilicate which is unaffected by pulverization and has a regulated pore structure which enables an ingredient supported thereon to fully perform its function.

With respect to ion exchange ability, the amorphous aluminosilicate produced by conventional processes has the following drawbacks. It is difficult to make the amorphous aluminosilicate stably exhibit high ion exchange ability because the ion exchange capacity thereof decreases even during the production thereof due to, for example, the heat treatment for drying, and because the amorphous aluminosilicate suffers a considerable decrease in ion exchange ability during only several-month storage even at room temperature. Hence, when the conventional amorphous aluminosilicate is used as an ion exchanger for, e.g., the removal of free metal ions, the ion exchange ability of the aluminosilicate is insufficient because of the insufficient exchange capacity thereof.

Consequently, the actually utilizable ion exchange capacities of conventional amorphous aluminosilicates have been up to about 50% of their theoretical exchange capacities calculated from the chemical compositions. Although the cause of such low actual exchange capacities has not been elucidated, it is thought that the sites which take part in ion exchange are severely affected, e.g., by the state of the Al atoms, Na atoms, and water molecules contained in the aluminosilicate framework or by the generation of a surface state which inhibits ion diffusion.

Consequently, there has been a strong desire for an amorphous aluminosilicate which is free from these problems.

SUMMARY OF THE INVENTION

An object of the present invention is to provide a novel amorphous aluminosilicate improved in ion exchange capacity, oil absorption (the amount of oil supported per unit weight), and dispersibility and exceedingly improved in the stable retention of these properties, by increasing the proportion of pores having a diameter in a specific range. Another object of the present invention is to provide a process for producing the amorphous aluminosilicate.

The present inventors have made intensive studies on properties of amorphous aluminosilicates. As a result, it has been found that an amorphous aluminosilicate which is inhibited from aggregating and suffers little decrease in oil absorption ability upon physical pulverization and which holds an ingredient in a moderate contact area and hence at a regulated holding power in a sufficiently diffusible manner can be obtained by controlling the diameters of particles to thereby regulate the pores constituted by these particles (macropores) to have a diameter in a specific range.

It has also been found that the ion exchange properties of an amorphous aluminosilicate are closely affected by the state of the pore structures (micropores) of the aluminosilicate, the water content, the stability of the water present, the degree of hydration of the sodium ions contained in the structures, etc. The stability of the ion exchange capacity has thus been found to be improved by regulating these pore structures in the amorphous aluminosilicate structure.

More particularly, it has been found that an amorphous aluminosilicate which overcomes the problems described above can be provided by regulating the total volume of the pores having a diameter in a specific range (i.e., from $10^3$ angstroms to $10^5$ angstroms as measured by the mercury penetration method) to at least 60% of the total volume of all the pores and by further regulating the total volume of the pores having a diameter of from 20 angstroms to 120 angstroms as measured by the nitrogen adsorption method to 0.01 cc/g or larger. The present invention has been achieved based on this finding. Due to the presence of these pores in a large amount, ions diffuse smoothly and a larger proportion of the theoretical ion exchange capacity can be utilized.

On the other hand, the presence of a large amount of very fine pores, e.g., pores having a diameter of 20 angstroms or smaller (as measured by the nitrogen adsorption method) may be regarded as advantageous for ion exchange because these fine pores are highly effective in obtaining an increased specific surface area. However, such fine pores are so small that hydrated ions cannot diffuse therein efficiently. Therefore, amorphous aluminosilicates having such fine pores in a large amount cannot exhibit sufficient performance as an ion exchanger even though they have a large specific surface area.

In contrast, in the case of an amorphous aluminosilicate in which too large pores (e.g., pores having a diameter of 60 angstroms or larger as measured by the nitrogen adsorption method) are present in a large amount, the specific surface area of this aluminosilicate is so small that sufficient inward diffusion is impossible and this aluminosilicate also cannot fully function as an ion exchanger.

That is, the presence of a large amount of pores having a diameter in a specific range is essential to the present invention. As a result, a considerable proportion of the specific surface area is attributable to these pores. The specific surface area of the amorphous aluminosilicate of the present invention is, for example, regulated so that the specific surface area attributable to the pores having a radius of from 30 angstroms to 50 angstroms as measured by the nitrogen adsorption method is 10 $m^2/g$ or larger. The upper limit of the above specific surface area is not particularly limited, but is probably 30 $m^2/g$.

Another factor which affects the ion exchange ability of an amorphous aluminosilicate is the water contained therein. The water herein means the water which is removable upon heating at 900° C. for 1 hour. That is, the water may include the low-energy free water which is weakly adherent to the surface and freely movable, the water strongly adsorbed onto the aluminosilicate structure or onto cations present in the structure, and high-energy water, e.g., the so-called constitution water contained in silanol groups present on the surface of the structure.

If the water content determined by the above method is too low, the amorphous aluminosilicate has low ion exchange ability or suffers a gradual decrease in ion exchange ability even at ordinary temperature. It is also important that the amorphous aluminosilicate shows an endothermic peak attributable to water vaporization in the relatively high temperature range of from 110° C. to 160° C. in differential thermal analysis using alumina as a reference, and that when the amorphous aluminosilicate is in a dry state, only the water which vaporizes at low temperatures has been removed from the aluminosilicate and the other waters are contained therein. An amorphous aluminosilicate which has almost the same water content but shows an endothermic peak at a temperature lower than 110° C. is defective in that high-energy water is removed earlier than low-energy water when the amorphous aluminosilicate is exposed to a high heat energy during drying, resulting in reduced or instable ion exchange ability.

When an amorphous aluminosilicate is analyzed by Na-MASNMR, it shows two peaks, i.e., a sharp one and a broad one, around a chemical shift of 20 ppm, and the broad peak indicates the presence of sodium ions having a low degree of hydration. Amorphous aluminosilicates containing a large amount of sodium ions having a low degree of hydration have reduced ion exchange ability. The reason for this may be that sodium ions having a low degree of hydration show reduced mobility in the structure.

The present inventors have also made intensive studies on a process for producing an amorphous aluminosilicate having regulated pores (macropores and micropores) and containing water in a stable state and sodium ions having high mobility and a high degree of hydration as described above. As a result, they have found that the above amorphous aluminosilicate can be obtained by using specific synthesis conditions and a specific drying method. The present invention has been achieved based on this finding.

The present invention provides:

1. An amorphous aluminosilicate wherein the total volume of the pores having a diameter of from $10^3$ angstroms to $10^5$ angstroms as measured by the mercury penetration method accounts for at least 60% of the total volume of all the pores detected by the mercury penetration method, and the total volume of the pores having a diameter of from 20 angstroms to 120 angstroms as measured by the nitrogen adsorption method is 0.01 cc/g or larger;

2. The amorphous aluminosilicate as described above, wherein the specific surface area attributable to the pores having a radius of from 30 angstroms to 50 angstroms as measured by the nitrogen adsorption method is 10 $m^2/g$ or larger;

3. The amorphous aluminosilicate as described above, which when heated at 900° C. for at least 1 hour undergoes a weight decrease of from 15% by weight to 35% by weight based on the weight thereof before heating and which shows an endothermic peak in the range of from 110° C. to 160° C. in differential thermal analysis using alumina as a reference, and wherein when the peaks present around a chemical shift of 20 ppm which are obtained by Na-MASNMR analysis are classified by peak form into a sharp peak and a broad peak, the proportion of the area of the board peak is 40% or less;

4. A process for producing the amorphous aluminosilicate as described above, which comprises adding an aqueous solution of an alkali metal aluminate maintained at 40° C. or lower to water maintained at 40° C. or lower and stirring the mixture, adding thereto an aqueous solution of an alkali metal silicate maintained at 40° C. or lower with stirring to react the ingredients at a temperature of 40° C. or lower, filtrating the resulting slurry, and then drying the resulting product at a temperature of lower than 100° C.

5. A process for producing the amorphous aluminosilicate as described above, which comprises adding an aqueous solution of an alkali metal silicate to an aqueous solution of an alkali metal aluminate to react the ingredients and drying the reaction product, said reaction being carried out at a temperature of 50° C. or lower, said addition of the aqueous solution of an alkali metal silicate being carried out in such a manner that the rate of this addition is from 0.10 to 1.50 per minute in terms of the change of the ratio of the Si atoms to the Al atoms present in the reaction system, the reaction system finally has an Si atom/Al atom ratio of from 0.25 to 6.00 and a hydroxide ion concentration in the mother liquor of from 0.4 mol/kg to 1.5 mol/kg, and the resulting slurry has a concentration of 20% by weight or lower, provided that the yield of the synthesized reaction product is regarded as 100%, and said drying of the reaction product being conducted at 90° C. or lower in terms of the temperature of the reaction product.

DETAILED DESCRIPTION OF THE INVENTION

Figure 1:
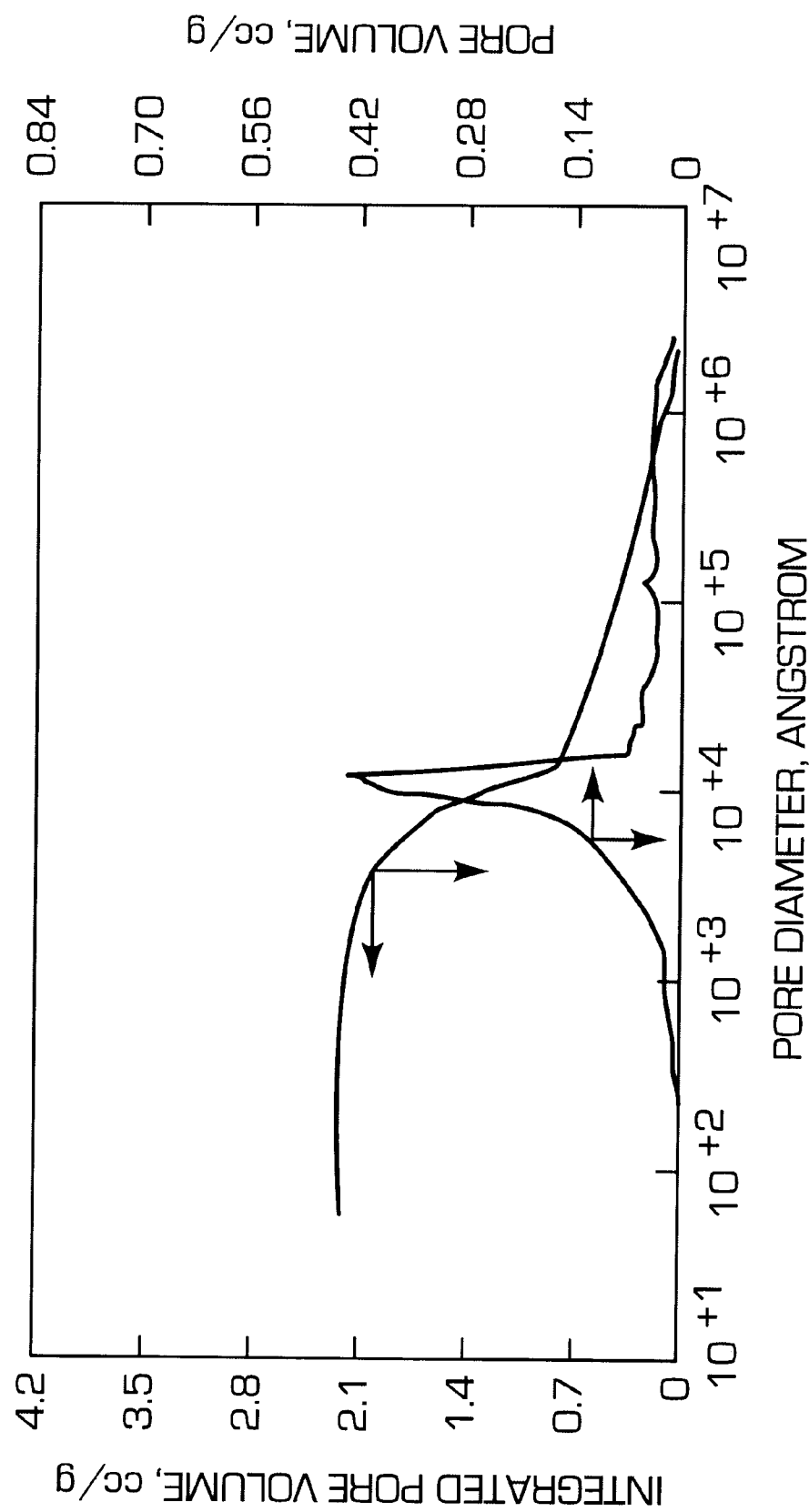
FIG. 1 shows the results of a pore distribution measurement by the mercury penetration method for the amorphous aluminosilicate obtained in Example 1.
Figure 2:
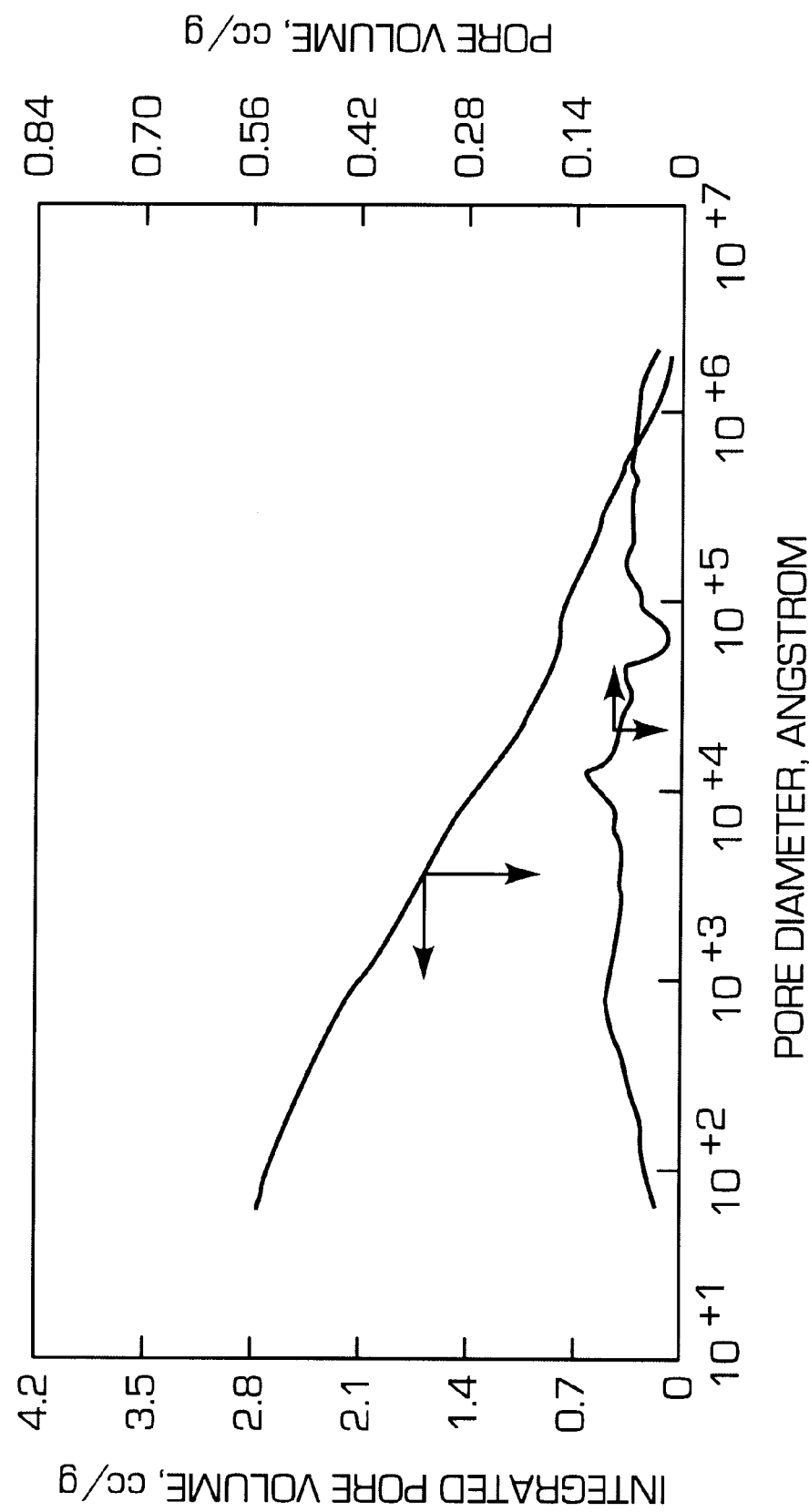
FIG. 2 shows the results of a pore distribution measurement by the mercury penetration method for the amorphous aluminosilicate obtained in Comparative Example 1.

An example of the process for producing the amorphous aluminosilicate of the present invention is explained below.

For obtaining the amorphous aluminosilicate of the present invention, which is improved in macropore and/or micropore structures and/or contains water in a stable state, it is necessary to take great care in controlling the reaction rate and removing unnecessary water. In the present invention, an aqueous solution of an alkali metal aluminate and an aqueous solution of an alkali metal silicate are, for example, used as starting materials for synthesis. If desired and necessary, an aqueous solution of an alkali metal hydroxide is used to dilute the above two solutions.

A commercially available aqueous alkali metal aluminate solution and a commercially available aqueous alkali metal silicate solution may be used as the two starting material solutions. Alternatively, the two starting material solutions may be prepared from an aluminum source, e.g., aluminum hydroxide, and a silica source, e.g., silicic acid, respectively by, for example, heating each of the two sources with an aqueous solution of an alkali metal hydroxide. These alkali metal salts are usually sodium salts when used industrially, but the salts for use in this invention are not particularly limited to sodium salts. The concentration of each of these solutions of an aluminum source and a silica source is preferably such that the concentration of the slurry of the amorphous aluminosilicate to be yielded by mixing the two solutions is 20% by weight or lower, preferably 10% by weight or lower, provided that the yield of the amorphous aluminosilicate is regarded as 100%.

If the two ingredients are mixed in too high an Si/Al ratio, not only a reduced ion exchange capacity results, but also the yield of silicic acid is reduced when the two ingredients mixed are an aqueous alkali metal aluminate solution and an aqueous alkali metal silicate solution. If the two ingredients are mixed in too low an Si/Al ratio, a reduced oily substance absorption capacity results. It is therefore preferred to mix the two ingredients in such a proportion that the Si/Al ratio is from 0.25 to 6.00.

Too high reaction temperatures are undesirable. Specifically, the synthesis is desirably conducted at 50° C. or lower, preferably at 40° C. or lower, more preferably around room temperature. If the reaction is carried out at a high temperature, not only the regulation of pore structures is impossible, but also part of the amorphous aluminosilicate crystallizes to form a sodalite, zeolite, or the like. This crystallization actually reduces oily substance absorption and other properties significantly.

In the case of batch mixing, the two ingredients should be mixed at such a rate that the change of the ratio of Si atoms to Al atoms is from 0.10 to 1.50 per minute. If the two ingredients are mixed under conditions outside this range, pore control is impossible.

It is preferred that the amorphous aluminosilicate slurry obtained by mixing the starting materials be separated as promptly as possible into the mother liquor and the amorphous aluminosilicate by filtration or another means and the resulting amorphous aluminosilicate be sufficiently cleaned under appropriate conditions to remove the mother-liquor components adherent thereto. The filter cake thus obtained is dried in an ordinary way. For example, the cake may be allowed to stand as it is and dry statically. The cake may also be spray-dried after being slurried by stirring if necessary with the addition of a necessary amount of water thereto.

In any drying method, however, mild drying is important. If rapid drying is conducted at a high temperature, the pore structures cannot be maintained. It is therefore necessary to dry the reaction product at a temperature of lower than 100° C., preferably 90° C. or lower in terms of the temperature of the product. Excessive drying should also be avoided. Specifically, it is important that the water content of the reaction product after drying be regulated to 15% by weight or higher, preferably in the range of from 20 to 35% by weight. For example, in the case of static drying, long-term exposure to a high temperature should be avoided. In the case of spray drying, the atmospheric temperatures employed in most cases are usable, but lower temperatures are preferred. Specifically, the drying conditions should be regulated so that the temperature of the reaction product is lower than 100° C., preferably not higher than 90° C. without fail, more preferably not higher than 60° C.

The present invention will be explained below in more detail by reference to the following Examples, but the invention should not be construed as being limited thereto.

In the Examples and Comparative Examples, examinations were carried out by the following methods.

(1) Method of Pore Distribution Measurement by the Mercury Penetration Method

Measurement was made with Poresizer 9310, manufactured by Micromeritics Co.

(2) Method of Pore Distribution Measurement by the Nitrogen Adsorption Method

Measurement was made with Omnisorp 360-CX, manufactured by Coulter Co.

(3) Method of Water Content Measurement

About 3 g of an amorphous aluminosilicate sample was precisely weighed out and placed in a crucible. This sample was heated at 900° C. for 1 hour or more and then allowed to cool. The resulting weight decrease was precisely measured and divided by the sample weight before heating, and this calculated value was expressed in terms of percentage.

(4) Method of Measuring Specific Surface Area Attributable to Pores with Radius of 30 to 50 Angstroms The specific surface area was calculated from the pore distribution measured with Omnisorp 360-CX manufactured by Coulter Co., using the following equation:

$$S = 2V_1/r_1 + 2V_2/r_2$$

wherein S is the specific surface area ($m^2/g$), $V_1$ is the volume of pores of 30 to 40 angstroms ($m^3/g$), $V_2$ is the volume of pores of 40 to 50 angstroms (m$^3$/g), $r_1$=40×10$^{-10}$ m, and $r_2$=50×10$^{-10}$ m.

(5) Conditions for Differential Thermal Analysis

About 20 mg of a sample was heated from room temperature to 1,150° C. at a heating rate of 10° C./min using alumina as a reference.

(6) Conditions for Na-MASNMR Analysis

A 45° pulse of $^{23}$Na was applied at an interval of 2 seconds, and measurement was repeated 64 times to reduce background noise.

(7) Method of Measuring Ion Exchange Ability

To 1 liter of aqueous calcium chloride solution (500 mg/l in terms of calcium carbonate concentration) was added an amorphous aluminosilicate in an amount of 1 g in terms of the amount of the anhydrous salt. This mixture was stirred at 25° C. for 10 minutes. The solid matter was then removed by filtration, and the amount of the calcium remaining in the filtrate was measured by titration with aqueous EDTA solution. Thus, the amount of the calcium exchanged per g of the amorphous aluminosilicate (anhydride) was determined in terms of CaCO$_3$ amount.

(8) Method of Oily Substance Absorption Measurement

A sample was pulverized as a pretreatment with, e.g., a cooking cutter and passed through a 75 μm screen. This sample was examined in accordance with JIS K 6221 by the linseed oil method, and the oily substance absorption per 100 g of the amorphous aluminosilicate (anhydride) was calculated.

(9) Degree of Aggregation

A sample powder was reduced to 100 μm or smaller, and this sample was kept in a sealed vessel at 60° C. for 72 hours. One gram of the thus-treated sample was added to 1 liter of water, and this mixture was stirred for 10 minutes and then filtered through a screen having an opening of 100 μm. The proportion of the sample remaining on the screen was calculated.

EXAMPLE 1

Into a reactor having a capacity of 20 liters was introduced 11,322 g of a 1.73 wt % aqueous solution of sodium hydroxide. While the contents were maintained at 30° C., 921 g of aqueous sodium aluminate solution (Na$_2$O=19.3 wt %, Al$_2$O$_3$=21.9 wt %) having a temperature of 30° C. was added thereto. This mixture was agitated vigorously. To the resulting solution was added 3,739 g of aqueous sodium silicate solution (Na$_2$O=4.0 wt %, SiO$_2$=12.7 wt %) having a temperature of 30° C. at a rate of 1,246 g/min with vigorous agitation. This addition took 3 minutes, during which period the change of the Si/Al molar ratio was 0.67 per minute. After the reaction, the mother liquor had a hydroxide ion concentration of 0.7 mol/kg. Stirring was continued for 20 minutes from completion of the addition. The resulting slurry was filtered immediately thereafter to remove the mother liquor, and the cake was cleaned on the filter using ion-exchanged water in an amount two times the amount of the slurry. The cake obtained was dried at about 50° C. and then evaluated for pore distribution, ion exchange ability, oily substance absorption ability, and degree of aggregation. The results obtained are shown in Table 1.

The results of the pore distribution measurement by the mercury penetration method are shown in FIG. 1.

EXAMPLE 2

A cake was obtained in the same manner as in Example 1, except that the concentration of the aqueous sodium hydroxide solution introduced into a 20-liter reactor was changed to 2.64 wt %, the reaction temperature was changed to 40° C., and the stirring time from the completion of addition was changed to 60 minutes. The cake obtained was dried at about 50° C., and then evaluated for pore distribution, ion exchange ability, oily substance absorption ability, and degree of aggregation. The results obtained are shown in Table 1.

EXAMPLE 3

A cake was obtained in the same manner as in Example 1, except that the concentration of the aqueous sodium hydroxide solution introduced into a 20-liter reactor was changed to 2.64 wt %, the hydroxide ion concentration of the mother liquor after the reaction was 1.1 mol/kg, and the stirring time from the completion of addition was changed to 60 minutes. The cake obtained was dried at about 50° C., and then evaluated for pore distribution, ion exchange ability, oily substance absorption ability, and degree of aggregation. The results obtained are shown in Table 1.

EXAMPLE 4

A cake was obtained in the same manner as in Example 1, except that the concentration of the aqueous sodium hydroxide solution introduced into a 20-liter reactor was changed to 5.74 wt %, the aqueous sodium silicate solution was added at a rate of 500 g/min over a period of 7.5 minutes, the hydroxide ion concentration of the mother liquor after the reaction was 1.4 mol/kg, and the stirring time from the completion of addition was changed to 60 minutes. The cake obtained was dried at about 50° C., and then evaluated for pore distribution, ion exchange ability, oily substance absorption ability, and degree of aggregation. The results obtained are shown in Table 1.

COMPARATIVE EXAMPLE 1

A cake was obtained in the same manner as in Example 1, except that the aqueous sodium hydroxide solution introduced into a 20-liter reactor was replaced by the same amount of water, the reaction temperature was changed to 55° C., the aqueous sodium silicate solution was added at a rate of 500 g/min over a period of 7.5 minutes, the hydroxide ion concentration of the mother liquor after the reaction was 0.4 mol/kg, and the stirring time from the completion of addition was changed to 60 minutes. The cake obtained was dried at about 50° C., and then evaluated for pore distribution, ion exchange ability, oily substance absorption ability, and degree of aggregation. The results obtained are shown in Table 1.

COMPARATIVE EXAMPLE 2

A cake was obtained in the same manner as in Example 1, except that the aqueous sodium hydroxide solution introduced into a 20-liter reactor was replaced by the same amount of water, the reaction temperature was changed to 35° C., the aqueous sodium silicate solution was added at a rate of 500 g/min over a period of 7.5 minutes, the hydroxide ion concentration of the mother liquor after the reaction was 0.4 mol/kg, and the stirring time from the completion of addition was changed to 60 minutes. The cake obtained was dried at about 50° C., and then evaluated for pore distribution, ion exchange ability, oily substance absorption ability, and degree of aggregation. The results obtained are shown in Table 1.

COMPARATIVE EXAMPLE 3

A cake was obtained in the same manner as in Example 1, except that the reaction temperature was changed to 65° C. and the stirring time after the completion of addition was changed to 60 minutes. The cake obtained was dried at about 50° C., and then evaluated for pore distribution, ion exchange ability, oily substance absorption ability, and degree of aggregation. The results obtained are shown in Table 1.

COMPARATIVE EXAMPLE 4

A cake was obtained in the same manner as in Example 1, except that the reaction temperature was changed to 60° C., the aqueous sodium silicate solution was added at a rate of 500 g/min over a period of 7.5 minutes, and the stirring time from the completion of addition was changed to 60 minutes. The cake obtained was dried at about 50° C., and then evaluated for pore distribution, ion exchange ability, oily substance absorption ability, and degree of aggregation. The results obtained are shown in Table 1.

COMPARATIVE EXAMPLE 5

A cake was obtained in the same manner as in Example 1, except that the reaction temperature was changed to 60° C., the aqueous sodium silicate solution was added at a rate of 500 g/min over a period of 7.5 minutes with the change of the Si/Al molar ratio during this addition being 0.27 per minute, and the hydroxide ion concentration of the mother liquor after the reaction was 0.4 mol/kg. The cake obtained was dried at about 50° C., and then evaluated for pore distribution, ion exchange ability, oily substance absorption ability, and degree of aggregation. The results obtained are shown in Table 1.

TABLE 1

| | Evaluation Items | | | | |
|---|---|---|---|---|---|
| | (1) | (2) | (3) | (4) | (5) |
| Example 1 | 64 | 0.18 | 249 | 243 | 2.51 |
| Example 2 | 70 | 0.10 | 245 | 217 | 1.32 |
| Example 3 | 78 | 0.25 | 252 | 234 | 1.11 |
| Example 4 | 81 | 0.18 | 247 | 221 | 0.04 |
| Comp. Ex. 1 | 39 | 0.03 | 176 | 170 | 7.55 |
| Comp. Ex. 2 | 48 | 0.17 | 189 | 157 | 8.45 |
| Comp. Ex. 3 | 38 | 0.00 | 157 | 178 | 6.11 |
| Comp. Ex. 4 | 38 | 0.00 | 175 | 172 | 7.68 |
| Comp. Ex. 5 | 57 | 0.00 | 181 | 153 | 8.09 |

Note) Evaluation Items:
(1) Proportion (%) of the volume of pores with a diameter of $10^3$–$10^5$ anstroms as measured by the mercury penetration method
(2) Total volume ($cm^3$/g) of pores with a diameter of 20–120 angstroms as measured by the nitrogen adsorption method
(3) Ion exchange ability (mg $CaCO_3$/g)
(4) Oily substance absorption ability (mg $CaCO_3$/g)
(5) Degree of aggregation (wt %)

EXAMPLE 5

Into a reactor having a capacity of 20 liters was introduced 11,322 g of water. While the contents were maintained at 30° C., 263 g of aqueous sodium aluminate solution ($Na_2O$=19.3 wt %, $Al_2O_3$=21.9 wt %) having a temperature of 30° C. was added thereto. This mixture was agitated vigorously. To the resulting solution was added 3,739 g of aqueous sodium silicate solution ($Na_2O$=4.0 wt %, $SiO_2$=12.7 wt %) having a temperature of 30° C. at a rate of about 500 g/min with vigorous agitation. This addition took about 7.5 minutes. Stirring was continued for 60 minutes from completion of the addition. The resulting slurry was filtered immediately thereafter to remove the mother liquor, and the cake was cleaned on the filter using ion-exchanged water in an amount two times the amount of the slurry. The cake obtained was slurried and then spray-dried at 90° C. in terms of the temperature of the reaction product. The amorphous aluminosilicate powder obtained was examined for water content, the specific surface area attributable to pores having a radius of 30–50 angstroms, ion exchange ability, and oily substance absorption ability by the methods described above. The results obtained are shown in Table 2.

EXAMPLE 6

An amorphous aluminosilicate was obtained in the same manner as in Example 5, except that the temperature for spray drying was changed to 80° C. The amorphous aluminosilicate powder obtained was examined for water content, the specific surface area attributable to pores of having a radius of 30–50 angstroms, ion exchange ability, and oily substance absorption ability by the methods described above. The results obtained are shown in Table 2.

EXAMPLE 7

An amorphous aluminosilicate was obtained in the same manner as in Example 5, except that the aqueous sodium silicate solution was added at a rate of 100 g/min over a period of 37.5 minutes and the temperature for spray drying was changed to 80° C. The amorphous aluminosilicate powder obtained was examined for water content, the specific surface area attributable to pores having a radius of 30–50 angstroms, ion exchange ability, and oily substance absorption ability by the methods described above. The results obtained are shown in Table 2.

COMPARATIVE EXAMPLE 6

An amorphous aluminosilicate was obtained in the same manner as in Example 5, except that the reaction temperature was changed to 50° C. and the temperature for spray drying was changed to 80° C. The amorphous aluminosilicate powder obtained was examined for water content, the specific surface area attributable to pores having a radius of 30–50 angstroms, ion exchange ability, and oily substance absorption ability by the methods described above. The results obtained are shown in Table 2.

COMPARATIVE EXAMPLE 7

An amorphous aluminosilicate was obtained in the same manner as in Example 5, except that the reaction temperature was changed to 50° C. and the cake obtained was dried not by spray drying but under conditions of 130° C. and a relative humidity of 10% for 24 hours. The amorphous aluminosilicate powder obtained was examined for water content, the specific surface area attributable to pores having a radius of 30–50 angstroms, ion exchange ability, and oily substance absorption ability by the methods described above. The results obtained are shown in Table 2.

TABLE 2

| | Evaluation Items | | | |
|---|---|---|---|---|
| | (1) | (2) | (3) | (4) |
| Example 5 | 90 | 24.6 | 12.1 | 231 |
| Example 6 | 80 | 27.5 | 14.1 | 230 |
| Example 7 | 80 | 27.0 | 12.7 | 228 |
| Comp. Ex. 6 | 80 | 27.8 | 5.8 | 201 |
| Comp. Ex. 7 | 130 | 24.4 | 6.8 | 192 |

Note) Evaluation Items:
(1) Temperature (° C.) of the reaction product during drying
(2) Water content (wt %)
(3) Specific surface area ($m^2$/g) attributable to pores with a radius of 30–50 angstroms
(4) Ion exchange ability (mg $CaCO_3$/g)

EXAMPLE 8

Into a reactor having a capacity of 20 liters was introduced 11,322 g of water. While the contents were maintained at 50° C., 263 g of aqueous sodium aluminate solution ($Na_2O$=19.3 wt %, $Al_2O_3$=21.9 wt %) having a temperature of 50° C. was added thereto. This mixture was agitated vigorously. To the resulting solution was added 3,739 g of aqueous sodium silicate solution ($Na_2O$=4.0 wt %, $SiO_2$=12.7 wt %) having a temperature of 50° C. at a rate of about 500 g/min with vigorous agitation. This addition took about 7.5 minutes. Stirring was continued for 60 minutes from completion of the addition. The resulting slurry was filtered immediately thereafter to remove the mother liquor, and the cake was cleaned on the filter using ion-exchanged water in an amount two times the amount of the slurry. The cake obtained was slurried and then spray-dried at 60° C. in terms of the temperature of the reaction product. The amorphous aluminosilicate powder obtained was subjected to water content measurement, NMR analysis, differential thermal analysis, and examination for ion exchange ability and oily substance absorption ability by the methods described above. The results obtained are shown in Table 3.

EXAMPLE 9

An amorphous aluminosilicate was obtained in the same manner as in Example 8, except that the temperature for spray drying was changed to 45° C. The amorphous aluminosilicate powder obtained was subjected to water content measurement, NMR analysis, differential thermal analysis, and examination for ion exchange ability and oily substance absorption ability by the methods described above. The results obtained are shown in Table 3.

COMPARATIVE EXAMPLE 8

An amorphous aluminosilicate was obtained in the same manner as in Example 8, except that the temperature for spray drying was changed to 65° C. The amorphous aluminosilicate powder obtained was subjected to water content measurement, NMR analysis, differential thermal analysis, and examination for ion exchange ability and oily substance absorption ability by the methods described above. The results obtained are shown in Table 3.

COMPARATIVE EXAMPLE 9

An amorphous aluminosilicate was obtained in the same manner as in Example 8, except that the cake obtained was dried not by spray drying but under conditions of 130° C. and a relative humidity of 10% for 24 hours. The amorphous aluminosilicate powder obtained was subjected to water content measurement, NMR analysis, differential thermal analysis, and examination for ion exchange ability and oily substance absorption ability by the methods described above. The results obtained are shown in Table 3.

TABLE 3

| | Evaluation Items | | | | | | |
|---|---|---|---|---|---|---|---|
| | (1) | (2) | (3) | (4) | (5) | (6) | (7) |
| Example 8 | 60° C. | 24.6 | 38 | 126 | 249 | 247 | 241 |
| Example 9 | 45° C. | 27.5 | 35 | 122 | 250 | 251 | 230 |
| Comp. Ex. 8 | 65° C. | 24.4 | 41 | 246 | 246 | 203 | 238 |
| Comp. Ex. 9 | 130° C. | 12.3 | 52 | 63 | 63 | 50 | 218 |

Note) Evaluation Items:
(1) Drying temperature
(2) Water Content (wt %)
(3) Proportion of the area of broad peak around 20 ppm in Na-MASNMR
(4) Position (° C.) of endothermic peak in differential thermal analysis
(5) Ion exchange ability (mg $CaCO_3$/g)
(6) Ion exchange ability (mg $CaCO_3$/g) after 30-day storage at room temperature
(7) Oil substance absorption ability ($cm^3$/100 g)

While the invention has been described in detail and with reference to specific examples thereof, it will be apparent to one of ordinary skill in the art that various changes and modifications can be made herein without departing from the spirit and scope of the invention.

What is claimed is:

1. An amorphous aluminosilicate wherein the total volume of the pores having a diameter of from $10^3$ angstroms to $10^5$ angstroms as measured by the mercury penetration method accounts for 64% or more of the total volume of all the pores having a diameter of about 60 angstroms to about $2 \times 10^6$ angstroms, and the total volume of the pores having a diameter of from 20 angstroms to 120 angstroms as measured by the nitrogen adsorption method is 0.10 cc/g or larger, said amorphous aluminosilicate, when heated at 900° C. for at least one hour, undergoing a weight decrease of from 15% by weight to 35% by weight and showing an endothermic peak in the range of from 110° C. to 160° C. in differential thermal analysis using alumina as a reference, said amorphous aluminosilicate having an oil absorption value in the range of 217 to 243 $cm^3$/100 g, after pulverizing so that the amorphous aluminosilicate has a size which passes through a 75 µm screen.

2. The amorphous aluminosilicate as claimed in claim 1, wherein the specific surface area of the pores having a radius of from 30 angstroms to 50 angstroms is 10 $m^2$/g or larger.

3. A process for producing the amorphous aluminosilicate as claimed in claim 1, which comprises adding an aqueous solution of an alkali metal aluminate maintained at 40° C. or lower to water maintained at 40° C. or lower and stirring the mixture, adding thereto an aqueous solution of an alkali metal silicate maintained at 40° C. or lower with stirring to react the ingredients at a temperature of 40° C. or lower, filtering the resulting slurry, and then drying the resulting product at a temperature of lower than 100° C.

4. The process as claimed in claim 3, wherein the reaction product is dried at 60° C. or lower.

5. A process for producing the amorphous aluminosilicate as claimed in claim 1, which comprises:

adding an aqueous solution of an alkali metal silicate to an aqueous solution of an alkali metal aluminate in amounts such that the Si/Al atomic ratio is from 0.25 to 6.00, and thereafter reacting said alkali metal silicate and said alkali metal aluminate at a temperature of 50° C. or lower to yield a slurry of reaction product of the alkali metal silicate and the alkali metal aluminate in a mother liquor where the reaction product is present in an amount of 20 wt % or less;

separating the reaction product from the mother liquor and drying the slurry of reaction product at 90° C. or lower to yield the amorphous aluminosilicate, wherein:

the aqueous solution of the alkali metal silicate is added to the aqueous solution of the alkali metal aluminate in such a manner that the number of Si atoms added per minute with respect to the number of Al atoms present is from 0.1 to 1.5 Si atoms per Al atom; thereby obtaining a final reaction system comprising said slurry of reaction product and said mother liquor which has a hydroxide ion concentration of from 0.4 mol/kg to 1.5 mol/kg.

6. The process as claimed in claim 5, wherein the reaction product is dried at 60° C. or lower.

* * * * *